(12) United States Patent
Morel et al.

(10) Patent No.: US 9,243,194 B2
(45) Date of Patent: Jan. 26, 2016

(54) PROCESS FOR HYDROCONVERSION OF HEAVY CARBON-CONTAINING FEEDSTOCKS THAT INTEGRATE A BOILING-BED TECHNOLOGY AND A SLURRY TECHNOLOGY

(75) Inventors: Frederic Morel, Chatou (FR); Patrick Sarrazin, Rueil Malmaison (FR); Alain Quignard, Roussillon (FR); Jan Verstraete, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 490 days.

(21) Appl. No.: 13/500,650

(22) PCT Filed: Sep. 28, 2010

(86) PCT No.: PCT/FR2010/000645
§ 371 (c)(1),
(2), (4) Date: May 25, 2012

(87) PCT Pub. No.: WO2011/042617
PCT Pub. Date: Apr. 14, 2011

(65) Prior Publication Data
US 2012/0234726 A1    Sep. 20, 2012

(30) Foreign Application Priority Data

Oct. 8, 2009   (FR) ..................................... 09 04819
Apr. 13, 2010  (FR) ..................................... 10 01560
Apr. 13, 2010  (FR) ..................................... 10 01561
Apr. 13, 2010  (FR) ..................................... 10 01562

(51) Int. Cl.
*C10G 65/12* (2006.01)
*C10G 65/10* (2006.01)
(Continued)

(52) U.S. Cl.
CPC .................. *C10G 65/12* (2013.01); *B01J 27/30* (2013.01); *C10G 49/04* (2013.01); *C10G 49/12* (2013.01);
(Continued)

(58) Field of Classification Search
CPC ............... C10G 2300/1003; C10G 2300/1011;
C10G 2300/202; C10G 2300/205; C10G 2300/206; C10G 2400/04; C10G 2400/08; C10G 49/12; C10G 49/14; C10G 49/16; C10G 65/12; C10G 65/10
USPC ......................................... 208/46, 58, 59, 108
See application file for complete search history.

(56) References Cited

U.S. PATENT DOCUMENTS 4,178,227 A   12/1979   Metrailer et al.
4,495,060 A    1/1985   Abrams
(Continued)

FOREIGN PATENT DOCUMENTS

FR   2 776 297 A1   9/1999
FR   2 791 354 A1   9/2000
(Continued)

OTHER PUBLICATIONS

Speight, G, Hydroprocessing of Heavy Oils and Residua, 2007, CPC Press, p. 15-17, 71-120, & 281-284.*
(Continued)

*Primary Examiner* — Renee E Robinson
*Assistant Examiner* — Derek Mueller
(74) *Attorney, Agent, or Firm* — Millen, White, Zelano and Branigan, P.C.

(57) ABSTRACT

The invention relates to a process for hydroconversion of heavy carbon-containing feedstocks that comprises a stage (1) for hydroconversion of the feedstock in at least one reactor that contains a boiling-bed catalyst and then a stage (2) for hydroconversion of at least a portion of the effluent that is obtained in at least one reactor that contains a slurry catalyst.

8 Claims, 3 Drawing Sheets

(51) Int. Cl.
  *C10G 49/12*   (2006.01)
  *C10G 49/16*   (2006.01)
  *B01J 27/30*   (2006.01)
  *C10G 49/04*   (2006.01)
  *C10G 49/22*   (2006.01)
  *C10G 67/02*   (2006.01)
  *B01J 27/049*  (2006.01)

(52) U.S. Cl.
  CPC ............ *C10G 49/16* (2013.01); *C10G 49/22* (2013.01); *C10G 67/02* (2013.01); *B01J 27/049* (2013.01); *C10G 2300/1003* (2013.01); *C10G 2300/1011* (2013.01); *C10G 2300/202* (2013.01); *C10G 2300/205* (2013.01); *C10G 2300/206* (2013.01); *C10G 2300/301* (2013.01); *C10G 2400/04* (2013.01); *C10G 2400/08* (2013.01)

(56) References Cited

U.S. PATENT DOCUMENTS

| | | | |
|---|---|---|---|
| 4,521,295 A | 6/1985 | Chervenak et al. | |
| 4,710,486 A | 12/1987 | Lopez et al. | |
| 5,178,749 A | 1/1993 | Lopez et al. | |
| 6,277,270 B1 | 8/2001 | Morel et al. | |
| 6,447,671 B1 | 9/2002 | Morel et al. | |
| 6,511,937 B1 | 1/2003 | Bearden, Jr. et al. | |
| 7,449,103 B2 | 11/2008 | Lott et al. | |
| 2005/0075527 A1* | 4/2005 | Pinault et al. | 585/809 |
| 2005/0241992 A1 | 11/2005 | Lott et al. | |
| 2005/0241993 A1 | 11/2005 | Lott et al. | |
| 2008/0149531 A1 | 6/2008 | Roy-Auberger et al. | |

FOREIGN PATENT DOCUMENTS

| | | |
|---|---|---|
| FR | 2 910 352 A1 | 6/2008 |
| WO | WO 2005/104749 A2 | 11/2005 |
| WO | WO 2009/070778 A2 | 6/2009 |

OTHER PUBLICATIONS

International Search Report of PCT/FR2010/000645 (Aug. 1, 2011).

* cited by examiner

PROCESS FOR HYDROCONVERSION OF HEAVY CARBON-CONTAINING FEEDSTOCKS THAT INTEGRATE A BOILING-BED TECHNOLOGY AND A SLURRY TECHNOLOGY

The invention relates to a process for the hydroconversion of heavy carbon-containing feedstocks (for example, petroleum waste, derivatives obtained from biomass, coal) into lighter, upgradable products such as fuels, raw materials for petrochemistry, . . . . More particularly, the invention relates to the processes with a boiling-bed technology and a slurry technology. Such processes are already widely used.

The technologies for hydroconversion of waste into boiling beds are known. For example, the H-Oil technology licensed by Axens and the LC-Fining technology licensed by Chevron-Lummus-Global, described in numerous documents, can be cited.

The boiling-bed technologies use substrate catalysts in the form of extrudates whose diameter is generally on the order of 1 mm or less than 1 mm. The catalysts remain inside the reactors and are not evacuated with the products. The temperature levels are high so as to obtain high conversions while reducing the quantities of catalysts used. The process requires a low hydrogen coverage rate (hydrogen/feedstock ratio). The catalytic activity can be kept constant using the on-line replacement of the catalyst. Therefore, it is not necessary either to shut down the unit to change the used catalyst, or to increase the reaction temperatures throughout the cycle to compensate for deactivation. In addition, the fact of working under constant operating conditions makes it possible to obtain constant yields and qualities of products throughout the cycle. Also, because the stirring of the catalyst is maintained by a significant recycling of liquid, the pressure drop in the reactor is low and constant, and the reaction exotherms are quickly averaged out over the catalytic bed, which is therefore nearly isothermal and does not require the injection of quenches. A specific feature of the boiling-bed process is that the unconverted vacuum residue has a relatively low viscosity and can therefore be recovered in liquid form.

However, the level of conversion of the boiling-bed technologies is generally limited to levels that are lower than 80% because of the catalytic system that is employed and the design of the unit.

The technologies for hydroconversion of waste into slurry are also known. For example, the EST technology licensed by ENI, the VRSH technology licensed by Chevron-Lummus-Global, the HDH and HDHPLUS technologies licensed by Intevep, the SRC-Uniflex technology licensed by UOP, the (HC)3 technology licensed by Headwaters, etc., can be cited.

The technologies for hydroconversion of waste into slurry use a catalyst that is dispersed in the form of very small particles, whose size is several tens of microns or less (generally 0.001 to 100 µm). The catalysts, or their precursors, are injected with the feedstock to be converted into the intake of the reactors. The catalysts pass through the reactors with the feedstocks and the products during conversion, and then they are entrained with the reaction products outside of the reactors. They are found after separation into the heavy residual fraction, such as, for example, the unconverted vacuum residue. The thermal levels are very high, which makes it possible to obtain the very high conversion levels starting from very heavy feedstocks. The processes require a high hydrogen coverage rate. One specificity of the slurry processes is that the unconverted vacuum residue has an extremely high viscosity and is therefore preferably evacuated from the unit in solid form.

The slurry processes are subjected to a difficult operability, and the conversion level, moreover, is not as high as desired.

To improve the performances of the boiling-bed process, the patents U.S. Pat. Nos. 7,449,103 and 5,300,212 teach the treatment of the feedstock in a slurry technology (with a catalyst slurry), and the effluent that is obtained (treated feedstock and catalyst slurry) is hydroconverted in a boiling-bed reactor.

It has now been found that the process that integrates a boiling-bed technology and then a slurry technology makes it become possible to reach conversion levels that would otherwise be unattainable by the two technologies separately, and that furthermore, the operability (in particular the service life) is significantly improved.

Thus, the conversion of a boiling-bed process reaches a limit of generally between 60-80% by weight, whereas that of the slurry process can reach 80-90% by weight. With the process according to the invention, conversions of more than 90% are attained, and even at least 95%.

The operability is improved owing to the combination of these two technologies, which makes possible a flexibility of the operating conditions and the catalytic system on each of the technologies (therefore the hydroconversion on each technology) based in particular on the feedstock that is to be treated. Actually, the catalysts that are used in the two technologies are different, and therefore neither one exhibits the same suitability for coking (which causes the deactivation of catalyst) nor entirely favors the same reactions of hydrotreatment, hydrocracking and thermocatalytic hydroconversion, unlike slurry processes already described followed by a boiling bed or each of these two processes cited that are used alone.

Also, rather than multiplying the reactors or providing numerous guard beds, the combination of the two technologies makes possible an increased flexibility of the process with a significant gain in operability.

In addition, the fact of beginning to treat the boiling-bed feedstock and then to treat it in slurry mode avoids passing catalyst slurry into the boiling bed. Thus, in each type of reactor (each technology), the operating conditions can be adjusted virtually separately, which makes possible an operability that is significantly improved relative to the prior art U.S. Pat. Nos. 7,449,103 and 5,300,212.

Thus, a wide range of carbon-containing (in particular hydrocarbon-containing) feedstocks can be treated with very high conversion levels. The service life of the catalysts (boiling bed) is increased, as well as the service lives of the entire process. If the service life of the units that operate with a catalyst bed in a boiling bed is set in general at around 2-4 years, the service life of the units that operate with a slurry catalyst bed is set at around 2 years; in the process according to the invention, the service lives are 3-4 years.

This means that the presence of the slurry technology has not impacted the operability of the boiling bed and/or that the service life of the unit that operates with the slurry catalyst was increased considerably.

Because of the optimization of the hydrotreatment and hydroconversion reactions in the two types of processes that are operated in series, the result is also that the total consumption of the boiling-bed catalyst can be reduced and that the concentration of slurry catalyst can be decreased, thus reducing the consumption of this slurry catalyst. It is estimated that, for the boiling bed, this reduction is at least 10% by weight and could even go up to 50% or more.

According to the operating conditions and the feedstock that is treated, the total consumption of the catalyst of the boiling bed can be reduced to a level such that the stage for separation and recycling of the slurry catalyst from the unconverted fraction becomes unnecessary.

In all of the cases, the boiling bed/slurry combination makes possible a significant reduction of the consumption of slurry catalyst, which makes it possible to reduce the size of the recovery/recycling unit of the slurry catalyst (if the latter is necessary), thus reducing the operating cost in a significant way. The addition of new catalyst is also reduced.

Another advantage of the process according to the invention is that the consumption of hydrogen can be adjusted, thus making the process very advantageous to the economic level, in particular relative to a slurry technology by itself. For example, this technology makes it possible to increase the hydrogen content in the upgradable products obtained from the process according to the invention, to the disadvantage of the production of C1-C2 incondensable gases and unconverted residue.

In addition, if a boiling-bed technology operates with a hydrogen to hydrocarbon volumetric ratio ($H_2$/HC ratio) that is low (200-300 $Nm^3/m^3$), it is not the same with a slurry technology ($H_2$/HC ratio of 600-1,000 $Nm^3/m^3$ in general, and in particular with the absence of a recycling pump). In contrast, the process according to the invention can operate in general with an $H_2$/HC ratio that is set between 200-300 $Nm^3/m^3$ for the boiling-bed technology and between 400-600 $Nm^3/m^3$ for the slurry technology, for conversion and hydrotreatment levels that are at least equal and most often greater than each of the technologies by itself.

The process according to the invention with the boiling-bed and then slurry hydroconversion sequence therefore proves to be extremely advantageous relative to the reverse sequence of the prior art (slurry then boiling bed). It was possible to note that this advantageous effect is due to the fact that, in the boiling-bed hydroconversion stage at moderate temperature, the condensed heavy structures (the most polar resins and asphaltenes) that can be cracked only with difficulty are hydrotreated here under favorable thermodynamic conditions, with a level of conversion of the feedstock that is already significant, while minimizing the conversion into gas and by preventing the formation of precursors of polycondensed aromatic molecules that are responsible for the formation of unconverted residue.

The effluent that is thus treated in the boiling-bed stage proves to have a much higher reactivity than the feedstock relative to the reactions for hydroconversion into slurry.

The result is that the loss of material in the form of gas or small hydrocarbons by supercracking is minimized, that the hydrotreatment level is maximized, that the operability of the hydroconversion into slurry is considerably improved (relative to a hydroconversion into slurry that accommodates the initial feedstock) and that, overall, the conversion of the feedstock into upgradable products is maximum. The result is thereby a significant gain in the economy of the process and increased overall conversion and hydrotreatment performance.

Furthermore, the effluent that is obtained from stage (2) is of very good quality, which allows subsequent treatments under less strict conditions (relative to each of the stages taken separately or the reverse sequence) with good yields for obtaining the product qualities that are required by commercial specifications at a lower treatment and production cost.

More specifically, the invention relates to a process for hydroconversion of heavy carbon-containing feedstocks comprising a stage (1) for hydroconversion of the feedstock in at least one reactor that contains a boiling-bed catalyst, then a stage (2) for hydroconversion of at least a portion of the effluent that is obtained in at least one reactor that contains a slurry catalyst, and optionally a solid additive; the effluent that is obtained from stage (2) is next subjected to one or more separation steps.

The carbon-containing feedstocks involved are hydrocarbon-containing (petroleum) feedstocks, such as petroleum wastes, crude oils, topped crude oils, deasphalted oils, deasphalting asphalts, derivatives of processes for conversion of petroleum (such as, for example: HCO, FCC slurry, heavy GO/coking VGO, visbreaking residue, or similar thermal processes, etc.), bituminous sands or their derivatives, bituminous shale or its derivatives, or non-petroleum feedstocks such as gaseous and/or liquid derivatives (containing no or few solids) of the thermal conversion (with or without catalyst and with or without hydrogen), coal, biomass or industrial waste, such as, for example, the recycled polymers.

More generally, feedstocks that contain at least 50% by weight of product boiling above 350° C. and at least 25% by weight distilling above 550° C. will be combined here under the term "heavy hydrocarbon-containing feedstock." They contain metals, essentially V and/or Ni, at a rate of generally at least 50 ppm and most often 100-2,000 ppm by weight, at least 0.5% by weight of sulfur, and at least 1% by weight of asphaltenes (asphaltenes with heptane), often more than 2% by weight or else 5% by weight, with contents of 25% by weight or more of asphaltenes that can be attained; they also contain condensed aromatic structures that can contain heteroelements that are refractory with regard to conversion.

The non-petroleum feedstocks (such as those obtained from thermal conversion, with or without catalyst and with or without hydrogen, coal and biomass) in general contain less than 50% by weight of product boiling above 350° C., with less than 10% by weight of asphaltenes (heptane) (generally less than 5% by weight of asphaltenes, most often less than 2% by weight of asphaltenes), but they contain 0.5 to 50% by weight of oxygen, 0.2 to 2% by weight of nitrogen, as well as the elements Na and/or Ca and/or K at a rate of generally 1 to 500 ppm by weight of alkalines. Other elements can be present, such as Si, Cl . . . .

These elements are harmful for the catalysts. The aromatic molecules that are contained in the feedstock are molecules that are partially or totally difficult to convert in the hydrotreatment/fixed-bed hydroconversion processes. The feedstocks contain very few (<5 ppm by weight) or no metals of type V and/or Ni.

The hydroconversion stage (1) is carried out in at least one reactor that operates with a boiling-bed catalyst.

With the boiling-bed technology being widely known, only the primary operating conditions will be set forth here.

The feedstock is treated in the presence of hydrogen in at least one three-phase reactor, containing at least one boiling-bed hydroconversion catalyst, operating with an upward current of liquid and gas. Catalyst can be removed from the reactor, without stopping the process, for making up with fresh catalyst.

The catalysts that are used are widely marketed. These are granular catalysts whose size never reaches that of catalysts used in slurry. The catalyst is most often in the form of extrudates or balls. Typically, they contain at least one hydrodehydrogenating element that is deposited on an amorphous substrate (in general alumina). In general, it involves a combination of at least one element from group VIII (Co and/or Ni) and at least one element from group VIB (Mo and/or W) deposited on a substrate whose pore distribution is suitable for the treatment of the feedstock. The catalysts Co/Mo/alumina and NiMo/alumina are the most common.

The total content of oxides of elements from groups VIII and VIB is often from 5-40% by weight and in general 7-30% by weight. In general, the ratio by weight that is expressed in terms of oxide(s) from group VI to oxide(s) from group VIII is 1-20 and most often 2-10.

It is possible, for example, to use a catalyst that comprises 0.5 to 10% by weight of nickel and preferably 1 to 5% by weight of nickel (expressed in terms of nickel oxide NiO) and 1 to 30% by weight of molybdenum, preferably 5 to 20% by weight of molybdenum (expressed in terms of molybdenum oxide $MoO_3$ on a substrate).

This catalyst can also contain phosphorus (in general less than 20% by weight and most often less than 10% by weight, expressed in terms of phosphorus oxide $P_2O_5$).

The used catalyst is partially replaced by fresh catalyst by drawing-off at the bottom of the reactor and introduction, either at the top of the reactor or at the bottom of the reactor, of fresh or new catalyst at regular time intervals, i.e., for example, in bursts or almost continuously. It is possible, for example, to introduce fresh catalyst every day. The rate of replacement of the used catalyst by fresh catalyst can be, for example, from approximately 0.01 kilogram to approximately 10 kilograms per cubic meter of feedstock. This drawing-off and this replacement are carried out using devices that make possible the continuous operation of this hydroconversion stage. The unit usually comprises a recirculation pump that makes it possible to keep the catalyst in a boiling bed by continuous recycling of at least one portion of the liquid that is drawn off at the top of the reactor and reinjected at the bottom of the reactor. It is also possible to send the used catalyst that is drawn off from the reactor into a regeneration zone in which the carbon and the sulfur that it contains are eliminated, and then in sending this regenerated catalyst into the hydroconversion stage. It is also possible to send the used catalyst that is drawn off from the reactor into a rejuvenation zone in which at least a portion of the deposited metals, primarily vanadium and nickel, is eliminated before regenerating the catalyst by eliminating the carbon and the sulfur that it contains, and then in sending this rejuvenated and regenerated catalyst into the hydroconversion stage.

The procedure is usually performed under an absolute pressure 2 at 35 MPa, most often from 5 to 20 MPa, at a temperature from approximately 300 to 500° C., often from approximately 350 to 450° C. The hourly volumetric flow rate (VVH) and the partial hydrogen pressure are selected based on the characteristics of the product that is to be treated and the desired conversion. Most often, the VVH is in a range that goes from approximately $0.1\ h^{-1}$ to approximately $10\ h^{-1}$ and preferably from approximately $0.5\ h^{-1}$ to approximately $5\ h^{-1}$. The quantity of hydrogen mixed with the feedstock is usually from about 50 to approximately 5,000 normal cubic meters ($Nm^3$) per cubic meter ($m^3$) of liquid feedstock and most often from approximately 100 to approximately 1,000 $Nm^3/m^3$, and very preferably from 300 to 500 $Nm^3/m^3$, and even more preferably from 200 to 300 $Nm^3/m^3$.

In the process according to the invention, the operating conditions, for a catalyst and a given feedstock, are adjusted based on the desired total conversion and based on that in stage (2) with the slurry technology.

Optionally, the converted effluent that is obtained from stage (1) in a boiling bed is subjected to a separation of the light fraction. Very predominantly, it contains (at least 90% by volume) the compounds that boil at most 300° C., and even up to 450° C. The residual effluent is treated in stage (2) for hydroconversion with a slurry catalyst.

These arrangements will be presented later in the text.

The converted effluent that is obtained from boiling-bed stage (1) can be treated directly in stage (2).

This separation prevents the supercracking of the light fraction in stage (2). It also makes it possible to reduce the economic investment in the reactor of stage (2) (less feedstock to be treated, less slurry catalyst to be injected, . . . ) or to bring an external feedstock onto the reactor of stage (2) or to increase the dwell time in the reactor of stage (2).

Thus, some or all of the effluent that is obtained from stage (1) is subjected to a hydroconversion with a slurry catalyst (stage (2)), in the presence of hydrogen, with an upward current of liquid, gas and catalyst. Stage (2) is carried out in at least one slurry reactor, and preferably at least one (and preferably all) of the reactors is equipped with an internal recirculation pump, of the same type as the one used by the boiling bed.

The slurry catalyst is in dispersed form in the reaction medium. It can be formed in situ, but it is preferable to prepare it outside of the reactor and to inject it, in general continuously, with the feedstock.

The catalyst promotes the hydrogenation of the radicals that are obtained from thermal cracking and reduces the formation of coke. When the coke is formed, it is evacuated by the catalyst.

The catalyst is as dispersed as possible to obtain a hydrogenating activity that is as uniformly distributed as possible in the reaction zone. It is kept suspended in the reactor, circulates from the bottom to the top of the reactor with the feedstock, and is evacuated with the effluent.

The slurry catalyst is a sulfur-containing catalyst that preferably contains at least one element that is selected from the group that is formed by Mo, Fe, Ni, W, Co, V, and Ru. These catalysts are in general monometallic or bimetallic (by combining, for example, an element from the non-noble group VIIIB (Co, Ni, Fe) and an element from group VIB (Mo, W).

The catalysts that are used can be powders of heterogeneous solids (such as natural minerals, iron sulfate, etc.), dispersed catalysts that are obtained from water-soluble precursors ("water-soluble dispersed catalyst") such as phosphomolybdic acid, ammonium molybdate, or an oxide mixture Mo or Ni with aqueous ammonia.

Preferably, the catalysts that are used are obtained from soluble precursors in an organic phase ("oil-soluble dispersed catalyst"). The precursors are organometallic compounds such as the naphthenates of Mo, Co, Fe or Ni, or such as the multi-carbonyl compounds of these metals, for example 2-ethyl hexanoates of Mo or Ni, acetylacetonates of Mo or Ni, C7-C12 fatty acid salts of Mo or W, etc. They can be used in the presence of a surfactant for improving the dispersion of metals, when the catalyst is bimetallic.

The catalysts are in the form of dispersed particles that may or may not be colloidal according to the nature of the catalyst.

Such precursors and catalysts that can be used in the process according to the invention are widely described in the literature.

In general, the catalysts are prepared before being injected into the feedstock. The process for preparation is adjusted based on the state in which the precursor and its nature are found. In all of the cases, the precursor is sulfurized (ex-situ or in-situ) for forming the catalyst that is dispersed into the feedstock.

For the preferred case of so-called oil-soluble catalysts, in a typical process, the precursor is mixed with a carbon-containing feedstock (which can be a part of the feedstock to be treated, an external feedstock, . . . ); the mixture is optionally dried at least partially, and then—or simultaneously—it is sulfurized by the addition of a sulfur-containing compound ($H_2S$ preferred) and heated.

The preparations of these catalysts are described in the prior art.

Additives can be added during the preparation of the catalyst or to the slurry catalyst before it is injected into the reactor. These are, for example, solid particles whose size is generally less than 1 mm, most often between 0.001 to 100 µm, and preferably their size is essentially equal to that of the slurry catalyst, or a diesel fuel, or an aromatic additive, . . . . These additives are described in the literature.

The preferred additives are mineral oxides such as alumina, silica, mixed Al/Si oxides, used substrate catalysts (for example, on alumina and/or silica) containing at least one element from group VIII (such as Ni, Co) and/or at least one element from group VIB (such as Mo, W). The catalysts that are described in the application US-2008/177124 will be cited, for example.

Coke, optionally pretreated, can also be used. The sizes of particles are preferably less than 1 mm, most often between 0.001 to 100 µm, and preferably their size is essentially equal to that of the slurry catalyst.

Numerous processes that operate with slurry are known, which essentially differ by the catalyst thereof and the operating conditions thereof.

The operating conditions in general are set within a range of 400-500° C. (typically 420 at less than 480° C.), pressures of 7-30 MPa, preferably 10-25 MPa, preferably 7-20 MPa, with volumetric flow rates of 0.2-2 $h^{-1}$, an $H_2$/HC ratio of 400-1,000 $Nm^3/m^3$, and very preferably between 400-600 $Nm^3/m^3$. In general, the conversion by putting the residue under 500° C.+ under a vacuum is in general between 70 and 85% by weight or more.

The known processes are EST of ENI operating at temperatures on the order of 400-420° C., under pressures of 10-16 MPa with a particular catalyst (molybdenite); (HC)3 of Headwaters operating at temperatures on the order of 400-450° C., under pressures of 10-15 MPa with the pentacarbonyl of Fe or the 2-ethyl hexanoate of Mo, the catalyst being dispersed in the form of colloidal particles; HDH and HDH-PLUS licensed by Intevep/PDVSA operating at temperatures on the order of 420-480° C., under pressures of 7-20 MPa, using a dispersed metallic catalyst; CASH of Chevron using a sulfurized catalyst of Mo or W prepared by aqueous means; SRC-Uniflex of UOP operating at temperatures on the order of 430-480° C., under pressures of 10-15 MPa; VCC of Veba operating at temperatures on the order of 400-480° C., under pressures of 15-30 MPa, using an iron-based catalyst; Microcat of Exxonmobil, etc.

All of these slurry processes can be used in the process according to the invention.

In a very preferred way, stage (1) operates under temperature conditions of 350-450° C., pressure of 7 to 20 MPa, hourly volumetric flow rate of 0.5-5 $h^{-1}$, with an $H_2$/HC ratio of 200-300 $Nm^3/m^3$, and stage (2) operates under temperature conditions of 420-480° C., pressure of 7 to 20 MPa, volumetric flow rate of 0.2-2 $h^{-1}$, with an $H_2$/HC ratio of 400-600 $Nm^3/m^3$.

The effluent that is obtained from stage (2) for hydroconversion into slurry is then subjected to one or more separation steps. The effluent is sent to a separation section unit whose purpose is to separate the gases ($H_2$, $H_2S$, $NH_3$, $H_2O$, C1-C5 hydrocarbons, . . . ), a fraction that contains the solid particles of catalyst, and one or more liquid fractions that lack solids and that are upgradable.

In a general way, the separation is carried out in a separation section unit that first of all comprises a high-pressure, high-temperature (HPHT) separator and optionally a high-pressure, low-temperature separator, and/or an atmospheric distillation and/or a vacuum distillation.

The extracted gases undergo a purification treatment for recovering hydrogen and recycling it to the hydroconversion reactor(s). The same holds true for the gaseous effluents that are obtained from subsequent treatment units, such as, for example, hydrocracking (FIG. 3).

The hydrogen recycling loop conventionally comprises a hydrogen purification treatment. The figures will be described below; for the sake of clarity in the presentation, a hydrogen loop is described here starting from FIG. 2. A treatment method is described in FIG. 2 as well as a compression unit. In FIG. 2, a single compressor with n stages (3 here) is used for supplying both the boiling-bed reactor(s) and slurry reactor(s) with make-up hydrogen (make-up) and recycling hydrogen. It would be equally possible to provide two separate compressors, one for the make-up hydrogen and one for the recycling hydrogen.

The unit for treatment of the hydrogen-rich gas conventionally comprises an HP (high-pressure) adsorber (25) and a unit with a membrane (26); the thus separated hydrogen is sent to the compressor (preferably in the $1^{st}$ or $3^{rd}$ stage via the pipes (29 and 30), whereas the residual gas can be treated by PSA ("pressure swing adsorption") (27) for separating residual hydrogen, also sent to be compressed, with the contaminants going into the fuel gas (28).

The fraction that is separated after stage (2) containing the solid particles of catalyst can be partly (preferred) or totally recycled into stage (2) but preferably never to stage (1). It can be recycled partly or totally directly or after having undergone various treatments for regenerating the catalyst. One part can be recycled directly and another part can be regenerated and then recycled.

When the residual catalytic activity of this catalyst is adequate, a portion of said fraction can be recycled directly to stage (2) for hydroconversion into slurry. This is in particular the case when the conversion of the process is at least 95% by weight; this fraction contains only a few upgradable hydrocarbons, but it contains the used catalyst in concentrated form. This is also the case when after the various separation steps, a fraction containing the solid particles of catalyst but containing only a few upgradable hydrocarbons is obtained.

In general, instead of recycling the fraction—that is separated after stage (2) and that contains the solid particles of catalyst—directly to the slurry reactor, said fraction undergoes separation step(s) and possible regeneration treatment(s)—for example combustion, washing with solvent, gasification, or any other separation technique (with these stages able to be combined). This/these treatment(s) make(s) it possible to recover particles that contain the slurry catalyst (or more precisely a catalyst precursor), which will be recycled to the preparation of the catalyst (therefore including sulfurization). The fraction that is separated after stage (2) and that contains the solid particles of catalyst is therefore partly or totally recycled to the preparation of the catalyst of stage (2) after having undergone separation step(s) and optional regeneration treatment(s). Such treatment processes are well known to one skilled in the art.

The separation and the regeneration of the catalyst that is contained in the fraction that contains the solid particles of catalyst can be carried out according to the processes that are described in the applications FR 10/01.560, FR 10/01.561 and FR 10/01.562 that are filed in the name of the applicant and that include in particular a liquid/liquid extraction stage, a coking stage, or a lixiviation stage respectively.

According to one embodiment, the separation and the regeneration of catalysts comprise:
a) Optionally, a fractionation stage that comprises a vacuum separation of said fraction that contains solid particles of catalyst, and a vacuum residue that is concentrated in metals is obtained,
b) A stage of liquid/liquid extraction of said fraction that contains solid particles of catalyst and/or of said vacuum residue as obtained in stage a) at a temperature of between 50 and 350° C. by an aromatic solvent and/or naphtheno-aromatic solvent and/or polar solvent, making it possible to obtain an extract that is concentrated in metals, and a raffinate,
c) A stage for combustion of said extract at a temperature of between 200 and 700° C. that makes it possible to obtain ashes that are concentrated in metals,
d) A stage for extraction of metals from the ashes obtained in the combustion stage,
e) A stage for preparation of metal solution(s) containing at least the metal of the catalyst that is/are recycled such as the catalyst in stage (2) for hydroconversion into slurry.

This process is described in the patent FR10/01.560:

The fraction that contains solid particles of the catalyst and that is obtained from the separation (for example via the HPHT separator) and that contains the metals and a fraction of solid particles used as a possible additive and/or formed during the reaction can be directed to a fractionation stage. This fractionation is optional and comprises a vacuum separation, for example one or more flash tanks and/or preferably a vacuum distillation, making it possible to concentrate a metal-rich vacuum residue at the bottom of the tanks or column and to recover one or more effluents at the top of the column. Preferably, the fractionation is done by vacuum distillation of at least one vacuum distillate fraction and one vacuum residue fraction, at least a portion and preferably all of said vacuum residue fraction being sent to the liquid-liquid extraction stage, with at least a portion and preferably all of said vacuum distillate fraction preferably being subjected to at least one hydrotreatment and/or hydrocracking stage.

The fraction that contains the solid particles of catalyst and/or the vacuum residue fraction from the vacuum separation (for example, drawn off at the bottom of vacuum distillation) are next directed to a liquid/liquid-type extraction stage. The objective of this stage is to concentrate the metals in the effluent to subsequently treat by combustion, while reducing the quantity thereof, and to maximize the yield of liquid effluent for treatment by hydrotreatment and/or hydrocracking.

The extraction is done at high temperature and using an aromatic- and/or naphtheno-aromatic- and/or polar-type solvent that may or may not be mixed in equal or different proportions, whereby said solvents preferably have high boiling points. The liquid/liquid extraction can be done in a mixer-decanter or in an extraction column. This extraction is distinguished from the deasphalting known by the prior art by the use of aromatic and/or naphtheno-aromatic and/or polar solvents that make possible a better separation of insoluble products (containing the metals) relative to the paraffinic solvents and also by a higher extraction temperature because it is necessary for keeping the fraction in the liquid phase.

The extraction stage can be implemented in one stage or preferably in two stages.

According to the embodiment of a liquid/liquid extraction in one stage, the operating conditions are in general a solvent/feedstock ratio of 0.5/1 to 20/1, preferably 1/1 to 5/1, a temperature profile of between 50° C. and 350° C., preferably between 150° C. and 300° C. The solvent that is used in the case of an extraction in one stage is preferably aromatic and/or naphtheno-aromatic and/or polar. As an aromatic solvent, it is possible to use toluene, xylene, a BTX mixture, phenol, cresols or their methyl derivatives, or a mixture of these solvents, or else a diaromatic solvent such as alpha-methyl naphthalene, but also fractions that are rich in aromatic compounds, such as LCO, HCO, aromatic extracts or GO or heavy GO fractions that may or may not be mixed in equal or different proportions. It can come directly from the process or any other refining process, such as, for example, the catalytic cracking in a fluidized bed (LCO/HCO-type solvent) or the units for extracting aromatic compounds from the production chains of lubricating bases. As a naphtheno-aromatic solvent, it is possible to use tetralin, indan, indene or a mixture of these solvents, as well as GO or heavy GO fractions that are obtained from the process or any other refining process and that may or may not be mixed in equal or different proportions. As a polar solvent, it is possible to use furfural, NMP (N-methyl-2-pyrrolidone), sulfolane, DMF (dimethylformamide), quinoline, THF (tetrahydrofuran), or a mixture of these solvents in equal or different proportions.

The solvent should be selected that has a boiling point that is high enough so as to be able to liquefy the fraction that contains solid particles of catalyst and/or the vacuum residue without vaporizing, with the fraction that contains the solid particles of catalyst and/or the vacuum residue typically being conveyed at temperatures of between 200 and 300° C. After contact of the solvent with the fraction that contains solid particles of catalyst and/or vacuum residue, two phases form, with the extract consisting of parts of the non-soluble residue in the solvent (and concentrated in metals) and the raffinate consisting of solvent and parts of soluble residue. The solvent is separated by distillation of the soluble parts and recycled internally in the liquid/liquid extraction process, with the management of the solvent being known to one skilled in the art.

According to the embodiment of a liquid/liquid extraction in two stages, a first extraction stage is implemented with an aromatic- and/or naphtheno-aromatic- and/or polar-type solvent, followed by a second extraction stage with a paraffinic-type solvent. In the case of the liquid/liquid extraction in two stages, the first extraction stage is strictly identical to the one that is described above for the extraction in one stage. After contact of the aromatic and/or naphtheno-aromatic and/or polar solvent with the residual fraction and/or the vacuum residue, two phases form, with the extract consisting of portions of non-soluble residue in the solvent (and concentrated in metals) and the raffinate consisting of solvent and portions of soluble residue. This soluble phase, after distillation of the solvent, is sent to the second stage for liquid-liquid extraction. This extraction is implemented by a paraffinic-type solvent, such as propane, butane, pentane, hexane, heptane, light naphtha coming from the process (after the hydrotreatment and/or hydrocracking treatment, for example) or any other refining process that may or may not be mixed in equal or different proportions. The operating conditions are in general a solvent/feedstock ratio of 1/1 to 10/1, preferably 2/1 to 7/1, a temperature profile of between 50° C. and 300° C., preferably between 120° C. and 250° C., according to the solvent being considered. After contact with the paraffinic solvent, two phases form. The extract consists of portions of non-soluble residue in the solvent containing very polar resins and asphaltenes, and the raffinate contains soluble portions containing no or very few asphaltenes. Using its low asphaltene concentration, at least a portion of the raffinate, and preferably all of it, can be mixed after separation from the solvent with the light fraction of the HPHT separator for a hydrotreatment and/or hydrocracking treatment.

The extract that is obtained from the liquid-liquid extraction in one stage or obtained from the first extraction stage in two stages is greatly concentrated in metals. This extract is directed to a combustion stage at moderate temperature. Actually, before being able to recover the metals by conventional metal extraction methods, a preliminary stage is necessary so as to separate the organic phase from the inorganic phase that contains the metals. Thus, the objective of the combustion stage is to obtain ashes that contain the metals that are easily recoverable in the subsequent metal recovery units, by burning the organic phase or the carbon phase of the extract at a temperature and a pressure that limit the vaporization and/or sublimation of metals, in particular that of molybdenum (sublimation temperature of approximately 700° C. for $MoO_3$). Thus, the reduction stage of the organic phase consists of combustion at moderate temperature so as to concentrate the metals, without significant loss by vaporization and/or sublimation to smoke, in a mineral phase that can contain a proportion of organic phase that ranges from 0 to 100% by weight, preferably 0% by weight to 40% by weight. The operating conditions of this combustion are in general a pressure of −0.1 to 1 MPa, preferably −0.1 to 0.5 MPa, a temperature of 200 to 700° C., preferably 400 to 550° C. The combustion is done in the presence of air.

The gaseous effluent that is obtained from combustion requires purification stages so as to reduce the emission of sulfur-containing and nitrogen-containing compounds into the atmosphere. The processes that are conventionally used by one skilled in the art in the field of treatment of the air are used under operating conditions that are necessary for meeting standards in force in the country of operation of such a treatment of a hydrocarbon feedstock.

The solid that is obtained from the combustion is a mineral phase that contains all or almost all of the metal elements contained in the extract, in the form of ashes.

The ashes that are obtained from the combustion are sent to a stage for extraction of metals in which the metals are separated from one another into one or more sub-stage(s). This recovery of metals is necessary because the simple recycling of ashes in the hydroconversion stage shows a very weak catalytic activity. In a general way, the stage for extraction of metals makes it possible to obtain several effluents, with each effluent containing a specific metal, for example Mo, Ni, or V, generally in the form of salt or oxide. Each effluent that contains a catalyst metal is directed toward a stage for preparation of an aqueous or organic solution that is based on a metal that is identical to the catalyst or to its precursor, used in stage (2) for hydroconversion into slurry. The effluent—containing a metal that is obtained from the feedstock that is not upgradable as catalyst (such as vanadium, for example)—can be upgraded beyond the process.

The operating conditions, the fluids and/or extraction methods used for the different metals are considered to be known to one skilled in the art and are already used industrially, as described in, for example, Marafi et al., Resources, Conservation and Recycling 53 (2008) 1-26, U.S. Pat. Nos. 4,432,949, 4,514,369, 4,544,533, 4,670,229 or US2007/0025899. The different methods of extraction of known metals include, in a general way, the lixiviation by acid and/or basic solutions, by ammonia or ammonia salts, the biolixiviation by microorganisms, the low-temperature heat treatment (roasting) by sodium or potassium salts, the chlorination or else the recovery of metals by electrolytic means. The lixiviation by acids can be done by inorganic acids (HCl, $H_2SO_4$, $HNO_3$) or organic acids (oxalic acid, lactic acid, citric acid, glycolic acid, phthalic acid, malonic acid, succinic acid, salicylic acid, tartaric acid . . . ). For basic lixiviation, in general ammonia, ammonia salts, soda or $Na_2CO_3$ is/are used. In the two cases, oxidizing agents ($H_2O_2$, $Fe(NO_3)_3$, $Al(NO_3)_3$ . . . ) can be present to facilitate the extraction. Once the metals are in solution, they can be isolated by selective precipitation (at different pH levels and/or with different agents) and/or by extraction agents (oximes, beta-diketone . . . ). Preferably, the stage for extraction of metals according to the invention comprises a lixiviation by at least one acid and/or basic solution.

The metals that are recovered after the extraction stage are generally in salt or oxide form. The preparation of catalytic solutions for producing the organic or aqueous solutions is known by one skilled in the art and has been described in the part for hydroconversion into slurry. The preparation of catalytic solutions relates in particular to the metals molybdenum and nickel, with the vanadium generally being upgraded as vanadium pentoxide, or in combination with iron, for the development of ferrovanadium, outside of the process.

The recovery rate of upgraded metals as catalyst for the stage (2) for hydroconversion into slurry or for vanadium is at least 50% by weight, preferably at least 65% by weight, and more generally 70% by weight.

According to another embodiment, the separation and the regeneration of catalysts comprise:
  a) Optionally, a fractionation stage that comprises a vacuum separation of said fraction that contains solid particles of catalyst, and a vacuum residue that is concentrated in metals is obtained,
  c) A coking stage of said fraction that contains solid particles of catalyst and/or said vacuum residue as obtained in stage a), making it possible to obtain a solid effluent that contains coke,
  d) A combustion stage of said solid effluent that contains coke at a temperature of between 200 and 700° C. that makes it possible to obtain ashes that are concentrated in metals,
  e) A stage for extraction of metals from the ashes obtained in the combustion stage,
  f) A stage for preparation of metal solution(s) containing at least the metal of the catalyst that is/are recycled as catalyst in stage (2) for hydroconversion into slurry.

This process is described in the patent FR10/01.561:

The fraction that contains the solid particles of catalyst and that is obtained from the separation (for example via the HPHT separator) and that contains the metals and a fraction of solid particles that is used as an optional additive and/or is formed during the reaction can be directed toward a fractionation stage by vacuum separation, preferably by vacuum distillation, as described above.

The fraction that contains solid particles of catalyst and/or the vacuum residue fraction from the vacuum separation (for example, drawn off at the bottom of vacuum distillation) are next directed to a coking-type thermal conversion stage. The objective of this stage is to concentrate the metals in the effluent that is to be treated subsequently by combustion, by reducing its quantity, and to maximize the yield of liquid effluent for the treatment by hydrotreatment and/or hydrocracking.

The coking stage can be carried out by delayed coking or by fluid-bed coking ("fluid-coking" or "flexi-coking"). In the case of a coking in a fluid bed, the temperature of the reactor is greater than 490° C., preferably between 500-550° C., at atmospheric pressure. Preferably, the coking is done by delayed coking, in at least two curing tanks. Before being sent into the curing tank, the feedstock is heated by heating furnaces. The operating conditions are a temperature at the outlet of the heating furnaces of the feedstock of between 460 and 530° C., preferably 480 and 510° C., and a temperature at the outlet of the curing tanks that is greater than 420° C., preferably between 430 and 490° C., and a pressure that is lower than 0.5 MPa, preferably 0.1 to 0.3 MPa. The recycling rate of the unconverted fraction of the curing tank is less than 20% by weight of the fresh feedstock, preferably less than 10% by weight. The coking is done under an inert atmosphere. The coking of the fresh feedstock is done continuously thanks to uniform switching between two curing tanks, one being in the coking phase while the other is in the decoking phase. The delayed coking stage produces a solid effluent that contains coke (and metals) and a liquid effluent. The liquid effluent is generally separated by distillation.

At least a portion and preferably all of the liquid effluent that is produced during the coking and that has a boiling point that is less than a temperature of between 300 and 400° C. (Liquid Cycle Gas Oil, LCGO) can be sent to a hydrotreatment and/or hydrocracking section mixed with the light fraction of the HPHT separator and/or with an external fraction.

At least a portion and preferably all of the solid effluent that contains coke that is highly concentrated in metals is directed to a moderate combustion stage and in the presence of oxygen. Optionally, a portion of the solid effluent that contains coke can be recycled as an additive in stage (2) for hydroconversion into slurry.

The combustion stage, the stage for extraction of metals from the ashes obtained in the combustion stage, and the stage for preparation of metal solution(s) that contain at least the metal of the catalyst that is/are recycled as catalyst in stage (2) for hydroconversion into slurry are identical to those that are described above in the case of the recovery of catalyst metals by liquid/liquid extraction in one or two stages.

The direct treatment of the solid effluent that exits from the coking by a metal extraction method as described above without combustion shows an inadequate metal recovery rate.

The recovery rate of metals upgraded as catalyst for the stage (2) for hydroconversion into slurry or for vanadium is at least 50% by weight, preferably at least 65% by weight, and more generally 70% by weight.

According to another embodiment, the separation and the regeneration of catalysts comprise:
a) Optionally, a fractionation stage that comprises a vacuum separation of said fraction that contains solid particles of catalyst, and a vacuum residue that is concentrated in metals is obtained,
b) A stage for liquid/liquid extraction by a solvent of a saturated nature of said fraction that contains solid particles of catalyst and/or said vacuum residue as obtained in stage a), making it possible to obtain a solid extract that is concentrated in metals and a raffinate,
c) A stage for grinding the solid extract that is concentrated in metals and that is obtained from the liquid/liquid extraction stage,
d) A stage for lixiviation of the ground extract in the presence of water, a solvent of a saturated nature, and a surfactant that makes it possible to obtain a solid extract and a lixiviate,
e) A stage for combustion in the presence of oxygen of said solid extract that is obtained from the lixiviation stage, making it possible to obtain ashes that are concentrated in metals,
f) A stage for extraction of metals from the ashes obtained in the combustion stage,
g) A stage for preparation of metal solution(s) that contain at least the metal of the catalyst that is/are recycled as catalyst in stage (2) for hydroconversion into slurry.

This process is described in the application FR 10/01.562:

The fraction that contains solid particles of catalyst and that is obtained from the separation (for example via the HPHT separator) and containing metals and a fraction of solid particles used as an optional additive and/or formed during the reaction can be directed to a stage for fractionation by vacuum separation, preferably by vacuum distillation, as described above.

The fraction that contains solid particles of catalyst and/or the vacuum residue fraction of the vacuum separation (for example drawn off at the bottom of vacuum distillation) are next directed to a liquid/liquid-type extraction stage. The objective of this stage is to concentrate the metals in the effluent to be treated subsequently by lixiviation and by combustion, by reducing its quantity, and to maximize the yield of liquid effluent for the treatment by hydrotreatment and/or hydrocracking.

The liquid/liquid extraction can be done in a mixer-decanter or in an extraction column. The operating conditions are in general a solvent/feedstock ratio of 1/1 to 10/1, preferably 2/1 to 7/1, a temperature profile of between 50° C. and 300° C., preferably between 120° C. and 250° C. according to the solvent being considered. The solvent that is used preferably has a saturated nature. It may be a paraffinic solvent, such as butane, pentane, hexane or heptane, and it may be mixed or not in equal or different proportions. The solvent can also be a light naphtha (C6 to C10) of a saturated nature, mixed or not in equal or different proportions with the paraffinic solvents cited above. After contact of the solvent with the residual fraction and/or the vacuum residue, two phases form, with the solid extract consisting of non-soluble residue parts in the solvent (and concentrated in metals) and the raffinate consisting of solvent and portions of soluble residue. The solvent is separated by distillation of soluble parts and recycled internally in the liquid/liquid extraction process, the management of the solvent being known to one skilled in the art.

The solid extract that is obtained from the liquid-liquid extraction is sent into a grinder that makes it possible to reach the desired grain size for the purpose of lixiviation. The grinding stage makes it possible to obtain a solid effluent with a particle size that is less than 6 mm, preferably less than 4 mm.

The ground solid is directed to a lixiviation-type extraction stage. The objective of this stage is to concentrate the metals again in the solid to be treated later by combustion, by reducing its quantity, and to maximize the yield of liquid effluent for the treatment by hydrotreatment and/or hydrocracking.

The lixiviation stage comprises several sub-stages, in particular:
a) A stage for preparation of an emulsion that comprises the ground extract from the grinding stage, water, a surfactant, and a solvent of a saturated nature,
b) A stage for curing the emulsion at a temperature of between 20 and 120° C.,
c) A stage for decanting by maintaining the temperature that makes it possible to obtain a solid extract and a lixiviate.

The lixiviation stage uses a mixture of water, a surfactant, and a solvent. The first stage consists in preparing an emulsion. A mixture of the solid ground with water and a surfactant is produced. The water/feedstock ratio is between 0.5/1 and 5/1, preferably between 1/1 and 2/1. The surfactant is used in concentrations that range from 0.05% by weight to 2% by weight relative to water and preferably 0.1% by weight to 1% by weight. A solvent is added to the solution that was prepared in advance. The solvent/feedstock ratio is between 2/1 and 6/1, preferably between 3/1 and 4/1.

The role of surfactant is to stabilize the dispersion of the extract in the water at the beginning and then to stabilize the solvent emulsion in the water. Thus, the surfactant is to be sufficiently hydrophilic. The surfactant in this invention can be an anionic, cationic or non-ionic surfactant as described in the application FR10/01.562. Preferably, the surfactant that is used in this invention is a mixture of fatty acid of tall oil and soda.

The solvent that is used is preferably a solvent of a saturated nature. It can be a paraffinic solvent, such as hexane or heptane, mixed or not in equal or different proportions. The solvent can also be a light naphtha (C6 to C10) of a saturated nature, mixed or not in equal or different proportions with the paraffinic solvents cited above. Heptane will preferably be used. The solvent that is used in the lixiviation stage can be identical to the solvent that is used in the liquid-liquid extraction stage and preferably selected from the group that is formed by hexane, heptane, a light naphtha (C6 to C10) of a saturated nature, mixed or not and in equal or different proportions, so as to facilitate the operation and to optimize the process.

The emulsion that comprises the ground feedstock, water, surfactant and the paraffinic solvent is brought to a temperature of between 20° C. and 120° C., preferably between 60° C. and 70° C., and mixed for a period of between 15 minutes and 3 hours. The mixture is next directed toward a decanting stage by maintaining the temperature for separating a solid extract that is highly concentrated at the bottom of the decanter and a lixiviate that is a light hydrocarbon phase that contains the solvent at the top of the decanting. The operating conditions are in general a dwell time of between 15 minutes and 30 hours. The lixiviate is sent to a separation section unit, for example of the flash type, so as to recycle the solvent upstream from the lixiviation section and/or toward the liquid-liquid extraction unit. The lixiviation extract that is highly concentrated with metals is directed toward a moderate combustion stage.

The combination of the liquid/liquid extraction and the lixiviation makes it possible to minimize the residual fraction to be treated and therefore to concentrate the metals. The combination of the liquid/liquid extraction stage and the lixiviation stage lead to a final lower residue yield for combustion relative to a double deasphalting with paraffinic solvents, for example. The level of extraction by lixiviation is therefore greater than the one that is obtained by double deasphalting.

The combustion stage, the stage for extracting metals from the ashes that are obtained in the combustion stage, and the preparation stage of metal solution(s) containing at least the metal of the catalyst that is/are recycled as catalyst in stage (2) for hydroconversion into slurry are identical to the ones that are described above.

The recovery rate of metal upgraded as catalyst for the process for hydroconversion into slurry or for vanadium is at least 50% by weight, preferably at least 65% by weight, and more generally 70% by weight.

The carbon-containing residual fraction that is obtained by separation of the effluent from stage (2) for hydroconversion into slurry, and from which gases and solid particles are removed, is distilled in such a way as to obtain LPG fractions (C3, C4) and distillates (naphtha, kerosene, diesel fuel); the distillates are subjected to subsequent treatments (hydrocracking, hydrotreatments . . . according to the fractions to be treated) to be upgraded. Advantageous embodiments will be presented below.

The separation after stage (2) is generally carried out in the following way. The effluent is separated (generally in an HPHT separator) into a so-called light fraction that for the most part (at least 90% by volume) contains the compounds that boil at at most 200° C., or at most 300° C., or at most 450° C., and even at at most 540° C.; they correspond to the compounds that are present in gases, naphtha, light diesel fuel, and even heavy diesel fuel. The other fraction is called a residual fraction.

It is indicated that for the most part, the fraction contains these compounds, because the separation is not done along a precise cutting point; it rather is similar to a flash. If it were necessary to speak in terms of a cutting point, one could say that it is between 200 and 300° C., or 200-450° C., and even 200-540° C.

These embodiments will be described below.

In particular, an embodiment will be described in which the effluent that is obtained from stage (2) is separated without decompression into a so-called light fraction that contains the compounds boiling to at most 540° C. and into a residual fraction that is vacuum-distilled to obtain a vacuum diesel fuel, with the so-called light fraction being hydrotreated and/or hydrocracked and then fractionated to obtain LPG, naphtha, kerosene, diesel and vacuum distillate.

An embodiment will also be described in which the effluent that is obtained from stage (2) is separated without decompression into a so-called light fraction that contains the compounds that boil at at most 450° C. and into a residual fraction; the gases are separated from the so-called light fraction, and a liquid fraction is obtained; said residual fraction, optionally diluted with said liquid fraction, is distilled, the diesel fuel that is produced is subjected to a hydrotreatment, and the vacuum diesel fuel that is produced is hydrocracked.

BRIEF DESCRIPTION OF THE DRAWINGS

In FIG. 1, the feedstock that is brought by the pipe (1) to the reactor (3) for boiling-bed hydroconversion is heated in advance in the furnace (2). The reactor contains boiling-bed catalyst; the internal separator (4) and the recycling pump (5) are distinguished from the separated liquid, ensuring the maintaining of the bed in the "boiling" state, arrangements that are indicative of the conventional technology of the boiling bed.

Figure 1:
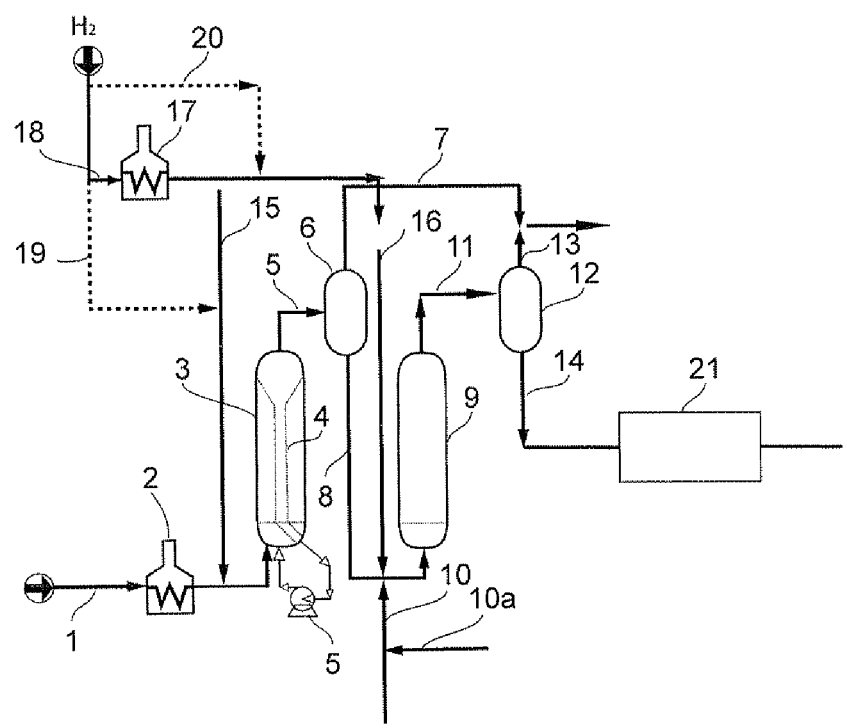
FIG. 1 is a diagram that illustrates the invention, without including the subsequent treatments of the separate fractions. The following figures have advantageous embodiments of said treatments.

The effluent that exits via the pipe (5) is advantageously sent into the inter-stage separator (6) (it is recalled that this separation is optional). A light fraction is separated via the pipe (7), and the residual fraction is recovered via the pipe (8). For the most part (at least 90% by volume), this light fraction contains the compounds that boil at at most 300° C., and even at at most 450° C.; they correspond to compounds that are present in the gases: naphtha, light diesel fuel, and even heavy diesel fuel. It is indicated that the fraction contains these compounds, for the most part, because the separation is not carried out along a precise cutting point; it rather is similar to a flash. If it were necessary to speak in terms of a cutting point, one could say that it is between 300° C. and 450° C.

This residual fraction (or the entire effluent in the absence of an inter-stage separator) is sent into the reactor (9) for hydroconversion into slurry that contains a catalyst slurry (also called a dispersed catalyst) injected via the pipe (10). This reactor can, in the same way as the boiling-bed reactor, contain an internal separation zone and a separate liquid recycling pump ensuring the dispersing of the catalyst into slurry and its circulation in the reactor under the conditions that are indicative of the conventional conditions of beds entrained in slurry. In the figure, the process and the means for the preparation of the catalyst slurry are not shown since these means are commonly described in literature.

FIG. 1 shows an advantageous, but not mandatory, arrangement (10a) in which one or more additives (as described above) are added to the feedstock at the same time as the slurry catalyst.

The effluent that is obtained from the reactor (9) drawn off via the pipe (11) is subjected to a separation, here in an HPHT (high-pressure, high-temperature) separator (12) for separating a light fraction via the pipe (13), and the residual fraction is recovered via the pipe (14). For the most part, this light fraction contains the compounds that boil at at most 200° C., and even at at most 300° C. or 450° C.; they correspond to the compounds that are present in the gases, naphtha, light diesel fuel, and even heavy diesel fuel. It is indicated that the fraction for the most part contains these compounds, because the separation is not done along a precise cutting point; it rather is similar to a flash. If it were necessary to speak in terms of a cutting point, one could say that it is between 200 and 300° C., and even between 200 and 450° C.

The supply of hydrogen to the reactors via the pipes (15) and (16) respectively comes from the make-up hydrogen and the recycled hydrogen. The hydrogen can be completely (pipe 18) or partly (pipes 18 and 19, on the one hand, and pipes 18 and 20, on the other hand) heated in the furnace (17).

In a general way, the management of different heat levels required by the boiling bed and the slurry bed is ensured by the final adjustment of temperatures of boiling-bed reactor(s) and slurry reactor(s) that is done, on the one hand, by the preheating furnace (17) of the recycling gas and make-up hydrogen, and, on the other hand, by the possible bypass around this furnace.

This arrangement is not incorporated in the other figures, so as not to clutter the diagrams, but it is of general application and can therefore be combined, in particular with the different embodiments described.

Figure 2:
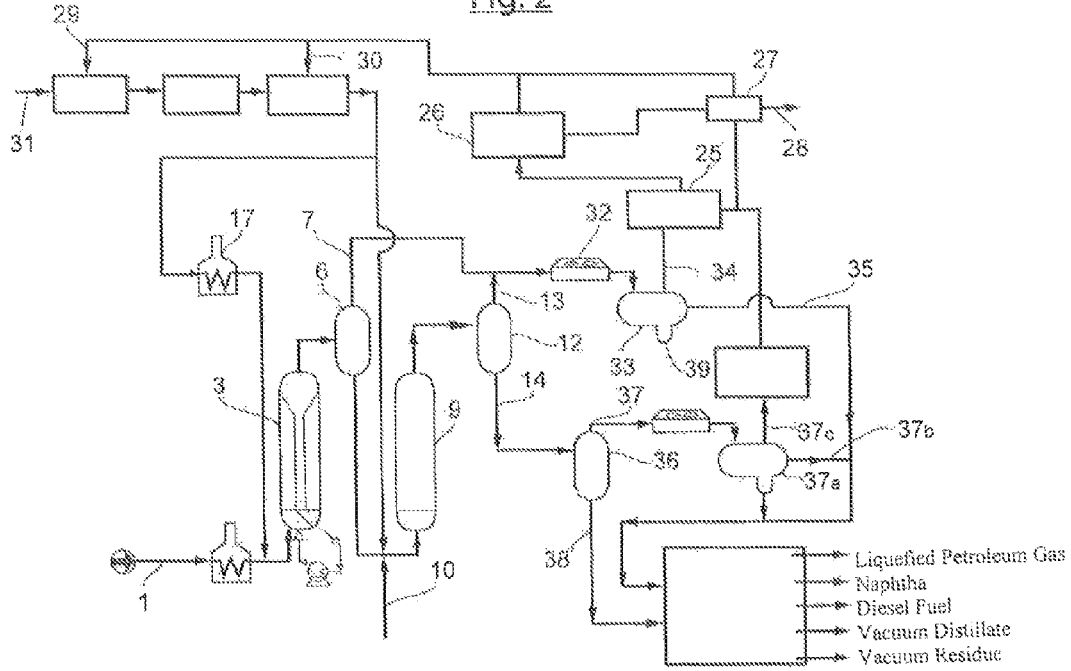
FIG. 2 shows the hydrogen recycling loop, a single system for compression, and, in a general way, the diagram for separation of the hydroconversion effluent.

FIG. 2 illustrates, in a general way, the use of a compressor with n stages (3 here) for the make-up hydrogen (31) and the recycling hydrogen (29 and 30). The gas treatment described previously will not be presented in more detail. The compressed hydrogen is next advantageously heated (possible bypass) and sent into the boiling-bed reactor(s) (3) and optionally preheated (17) before being sent into the slurry reactor(s) (9).

The reference numbers of the primary elements of FIG. 1 are incorporated.

In this embodiment (which FIG. 1 incorporates), the phase that is separated in the pipe (13) is a gaseous phase that contains hydrogen, the gases that are obtained from hydroconversion ($NH_3$, $H_2S$, $H_2O$, $CO$, $CO_2$, . . . ) and light hydrocarbons (C1-C4).

The gaseous phase is cooled here in the cooler (32) before being sent to the HPLT (high-pressure, low-temperature) separator (33) for separating a hydrogen-rich gas (34) sent to the treatment of gases (described above), optionally water (39) and a liquid fraction (35).

In the figure, it is noted that the gaseous phase (7) that comes from the inter-stage separator is added to the gaseous phase (13). This arrangement is not mandatory, and the separator may not be present.

The residual liquid fraction (14) that is obtained from the HPHT (high-pressure, high-temperature) separator (12) is sent to the separation section unit. According to FIG. 2, the latter comprises a medium- or low-pressure, high-temperature separator (36) that separates a gas phase (37), sent to the gas treatment unit that is already described.

Here, it is shown that this phase can be cooled in advance, separated at low temperature (37a) for improving its purification. The liquid fraction (in general, a fraction that for the most part contains the compounds that boil at at least 150° C.) (pipe 37b) is treated with the fraction (35), with this arrangement being preferred. The gaseous phase (pipe 37c) is sent to the gas treatment unit already described.

At the end of the separator (36), a residual liquid phase (38) is obtained that is fractionated (distillation or atmospheric flash and distillation or vacuum flash), with the fraction (35) for obtaining the following fractions: LPG (C3, C4), naphtha, diesel fuel, VGO (vacuum distillate), and VR (vacuum residue). This/these naphtha, diesel fuel and VGO fraction(s) are subjected to a treatment to bring them to the required specifications (content of sulfur, octane, cetane, etc.).

Figure 3:
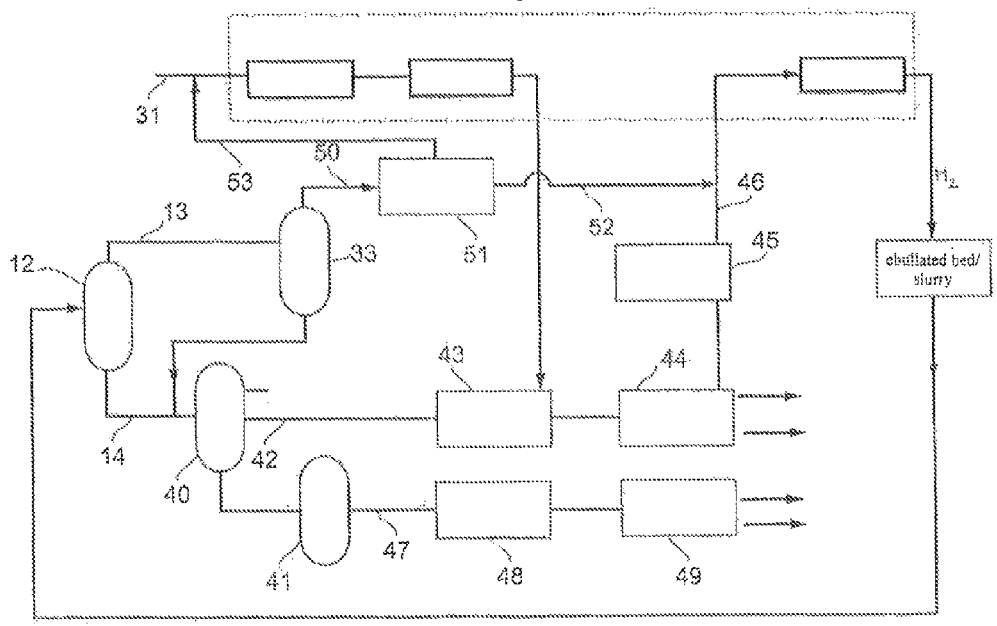

This is what FIG. 3, in which the section for separation of the residual fraction (14) comprises an atmospheric distillation (40) and a vacuum distillation (41), illustrates. The diesel fuel that is produced (pipe 42) is hydrotreated (43) to be brought to specifications (content of sulfur, cetane, content of aromatic compounds, etc.).

Here, a treatment by the so-called Prime-D process that is widely known is preferably considered: "Upgrade Hydrocracking Resid [sic] through Integrated Hydrotreating," S. Putek, D. Januszewski, E. Cavallo, Hydrocarbon Processing, September 2008.

A catalyst is used that is known to one skilled in the art and that consists of a combination of at least one element from group VIII (Co and/or Ni) and at least one element from group VIB (Mo and/or W), deposited on an alumina substrate whose pore distribution is suitable for the treatment of diesel fuel. The catalysts CoMo/alumina and NiMo/alumina are the most common. This catalyst can also contain phosphorus. The treatment process is performed, for example, under the following conditions: at temperatures of 300 to 420° C., pressures of 2 to 15 MPa, a volumetric flow rate of 0.2 to 2 $h^{-1}$, and an $H_2$/HC ratio of between 100 to 1,000 $Nm^3/m^3$ of feedstock.

After fractionation (unit 44), the diesel fuel is recovered as well as the lighter fractions that would have been able to be produced, including a hydrogen-rich gas, which after an optional treatment (45) is sent to the compressor (the $3^{rd}$ stage is suitable here) (pipe 46).

The VGO (vacuum diesel fuel pipe 47) is hydrocracked (48) and then fractionated (49).

The hydrocracking is a process that is extensively described in literature, which can operate in one or more stages.

The conventional hydrocracking catalysts are based on weakly acidic amorphous substrates, such as the amorphous silica-aluminas. These substrates are combined either with a metal from group VIII or with a combination of sulfides of the metals from groups VIB and VIII. Other conventional catalysts comprise the Y zeolite that is of the FAU structural type, an amorphous refractory oxide substrate (most often alumina), and at least one hydro-dehydrogenating element (in general at least one non-noble element from groups VIB and VIII, and most often at least one element from group VIB and at least one non-noble element from group VIII).

In general, the hydrocracking process comprises a hydrorefining for reducing the heteroatom content before the hydrocracking.

The conventional hydrorefining catalysts contain at least one amorphous refractory oxide support (most often alumina) and at least one hydro-dehydrogenating element (in general at least one non-noble element from groups VIB and VIII, and most often at least one element from group VIB, and at least one non-noble element from group VIII).

In the hydrorefining, the feedstock is brought into contact, in the presence of hydrogen, with at least one catalyst as described above, for example under the following conditions: at a temperature of between 330 and 450° C., preferably 360-420° C., under a pressure of between 5 and 25 MPa, preferably less than 20 MPa, with the volumetric flow rate being between 0.1 and 6 h$^{-1}$, preferably between 0.2 and 3 h$^{-1}$, and the quantity of hydrogen that is introduced is such that the hydrogen to hydrocarbon volumetric ratio ($H_2$/HC ratio) is between 100 and 2,000 Nm$^3$/m$^3$ of feedstock. The operating conditions that are used in the hydrocracking are: a temperature of greater than 200° C., often between 250-480° C., advantageously between 320 and 450° C., preferably between 330 and 425° C., under a pressure that is greater than 0.1 MPa, often between 5 and 25 MPa, preferably less than 20 MPa, and even more advantageously greater than 9 MPa or, better, greater than 10 MPa, with the volumetric flow rate being between 0.1 and 20 h$^{-1}$ and preferably between 0.1-6 h$^{-1}$, preferably between 0.2-3 h$^{-1}$, and the quantity of hydrogen that is introduced is such that the hydrogen to hydrocarbon volumetric ratio is between 80 and 5,000 Nm$^3$/m$^3$ and most often between 100 and 2,000 Nm$^3$/m$^3$.

On the pipe (13) that draws off the gaseous phase, the HPLT (high-pressure, low-temperature) separator (33) that separates a hydrogen-rich gas (50) that, after treatment (51), is sent (pipes 52, 53) to the suitable stage of the compressor is clearly shown.

Advantageously, a single compressor is used, and the hydrogen for the treatment (43) of the diesel fuel (conventional hydrotreatment, Prime-D, . . . ) will be provided by an intermediate stage (here, the 2$^{nd}$ stage), whereas the process according to the invention (boiling bed followed by slurry) will be supplied by the 3$^{rd}$ stage of the compressor.

The use of this single n-stage compressor with recycling of hydrogen and an elegant combination of units allows optimized management of the hydrogen to ensure the proper coverage rate ($H_2$/HC) at the boiling-bed reactor(s) and slurry reactor(s).

It is equally possible to send the diesel fuel and VGO fractions to the hydrocracking with a comparable scheme but without a Prime-D-type process.

As regards naphtha, it may be hydrotreated in a dedicated unit or else be sent to the Prime-D-type unit or to the hydrocracking unit where it is brought to the characteristics of a feedstock that is acceptable for catalytic reforming.

Figure 4:
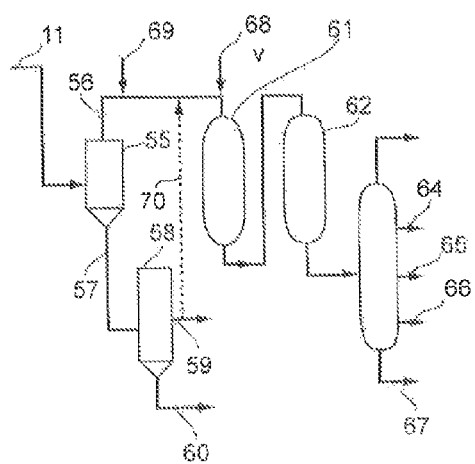
FIG. 4 shows the embodiment of treatment of the so-called integrated hydroconversion effluent, i.e., without decompression or separation between the hydroconversion stage and the treatment stage of the effluent.

FIG. 4 shows an integrated embodiment, i.e., without decompression between the hydroconversion reactors and the treatment of the effluent.

The effluent that comes from stage (2) for hydroconversion into slurry arrives via the pipe (11); it passes into the HPHT (high-pressure, high-temperature) separator (55) for separating a hydrocarbon fraction (pipe 56) that contains for the most part (at least 90%) compounds with a boiling point of at most 540° C., and even at most 450° C. or 440° C.

The residual fraction (pipe 57) for the most part (at least 90%) contains compounds with boiling points that are less than 440° C., and even 500° C. or 540° C. In the same way as above, the separation is not clear; if it was necessary to provide a cutting point, this would be between 440 and 540° C., preferably between 450 and 540° C.

This residual fraction is vacuum-distilled (58) for recovering the upgradable VGO (vacuum diesel fuel) (pipe 59) and a vacuum residue (pipe 60), on which the slurry catalyst will be recovered according to the processes that were already mentioned.

The lighter fraction (56) is only hydrotreated (for example before being sent to the FCC, fluidized bed catalytic cracking unit) or hydrotreated and hydrocracked (hydrotreatment 61 followed by hydrocracking 62) in the presence of hydrogen (68), and the effluent is fractionated (63) to obtain an LPG fraction (C3-C4), naphtha (64), kerosene (65), diesel (66), and VGO (67). In the case of a hydrocracking with recycling of VGO, the conversion of the feedstock into light and middle distillates (LPG, naphtha, kerosene, diesel) is then total.

An external fraction that generally comes from another process located in the refinery or optionally outside of the refinery (pipe 69) can be brought in before hydrotreatment; advantageously, the external fraction is, for example, the VGO obtained from the fractionation of crude oil (straight-run VGO), the VGO that is obtained from a conversion, an LCO (light cycle oil) or an HCO (heavy cycle oil) of FCC. Very advantageously, it is sent to the hydrotreatment or to the hydrocracking with all or part of the VGO that is generated by the distillation of the residual fraction (pipe 59*a*).

The advantage of this process is its integration at pressures and heat, resulting in a process that overall consumes less energy and emits less $CO_2$ (compared to any of the technologies taken separately). Another advantage is the production of products (kerosene, diesel, VGO that can be used as oil bases, for example) directly meeting specifications (sulfur, cetane . . . ) by the adjustment of operating conditions (in the forms of known conditions) according to the separated fraction (56). The naphtha can be used as a vapor reforming feedstock or as a base for fuel after a suitable treatment, such as, for example, catalytic reforming.

Figure 5:
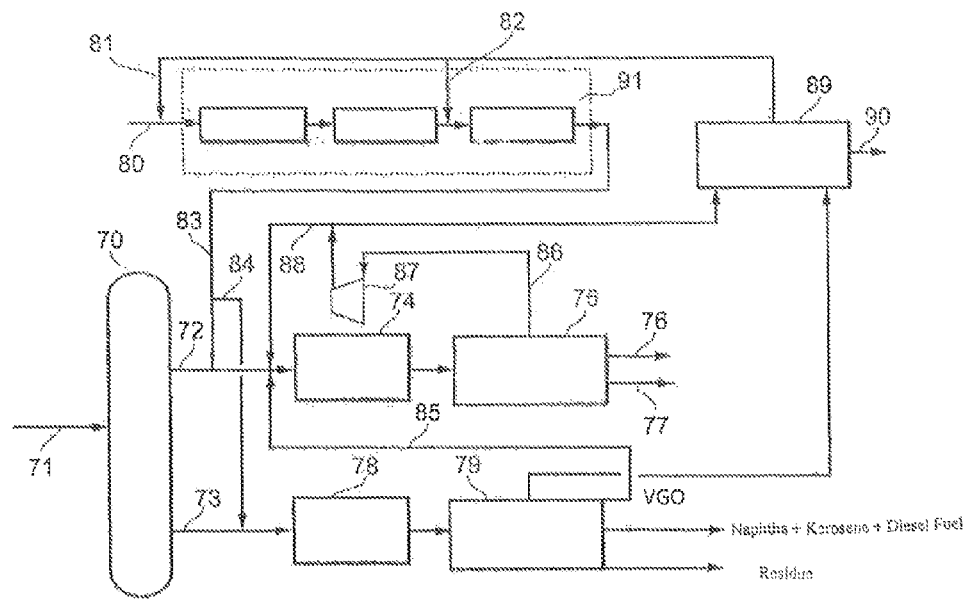
FIGS. 3 and 5 show different embodiments of treatments of the effluent after separation (FIG. 2)

FIG. 5 has a possible positioning of the process according to the invention in the refinery at the vacuum distillation column (70) of the atmospheric residue (71) that comes from the atmospheric distillation of crude oil.

Primarily, a VGO (72) and a vacuum residue VR (73) are separated. In a conventional way, the VGO is treated by hydrocracking (74) followed by separation (75) to produce in particular naphtha (76), kerosene and diesel (77).

According to the invention, the vacuum residue (73) is treated in the reaction zone of the process of the invention (78) and then after separation and fractionation (79), naphtha, kerosene, diesel fuel, and VGO are obtained in particular. One or more of these fractions, preferably the VGO, can next be sent to the hydrocracking unit (74) via the pipe (85).

The hydrogen loop is completely optimized; the make-up hydrogen (80) is compressed in the 3-stage compressor (91) as well as the recycling hydrogen (pipes 81 and 82). The compressed hydrogen supplies the hydrocracking (pipe 83) and the hydroconversions according to the invention (pipe 84).

Preferably, the hydrogen that is separated in the process of the invention supplies (after optional treatment) the hydrocracking (pipe 83). The hydrogen that is separated from the hydrocracking (pipe 86) is compressed (compressor 87) before being partly recycled to the hydrocracking (pipe 88) and partly treated (unit 89) to eliminate the contaminants that are sent to the fuel gas (90) and to be recycled to the general compression unit (91) with n stages (3 here).

The example below illustrates the invention and its advantage.

EXAMPLE

Case of Application to an Athabasca-Type Vacuum Residue

This example compares the performances on the same feedstock of the conventional boiling-bed process (with 2 reactors), of the conventional slurry process (with 2 reactors), and of the new process that integrates a boiling-bed reactor and a slurry reactor.

The feedstock that is being considered in this example is a vacuum residue that is obtained from an Athabasca heavy petroleum in Canada.

The properties of the vacuum residue are the following:

| | |
|---|---|
| Density at 15° C. | 1.063 |
| Nitrogen, % by Weight | 0.6 |
| Sulfur, % by Weight | 5.62 |
| Conradson Carbon, % by Weight | 23.1 |
| C7 Asphaltenes, % by Weight | 16.7 |
| Nickel, ppm by Weight | 125 |
| Vanadium, ppm by Weight | 360 |
| 500° C.−/550° C.− | 5% by Weight/10% by Weight |
| Viscosity at 150° C. (cSt) | 680 |

The following table sums up the operating conditions and the performances for the 3 cases:

| | Process with 2 Boiling-Bed Reactors | Process with 2 Slurry Reactors | Process with Boiling Bed and Slurry |
|---|---|---|---|
| Capacity, Mt/year | 2,000,000 | 2,000,000 | 2,000,000 |
| $1^{st}$ Mean Temperature Reactor, ° C. | 425 | 445 | 435 |
| $2^{nd}$ Mean Temperature Reactor, ° C. | 435 | 455 | 460 |
| $1^{st}$ Partial Pressure Reactor of Hydrogen at the Reactor Outlet, MPa | 13.0 | 13.0 | 13.0 |
| Conversion of the Vacuum Residue, 500° C.+, % by Weight | 75 | 90 | 95 |
| HDS, % | 80 | 70 | 79 |

The new process according to the invention therefore makes it possible to obtain the highest conversion relative to the boiling-bed and/or slurry processes taken separately. In addition, the HDS level—and more generally the performance levels in hydrotreatment such as HDN (hydrodenitrification), HDCCR (reduction of Conradson carbon), HDM (hydrodemetallization), and HDCa (hydrogenation of the aromatic carbon)—remains at a very high level, comparable to the boiling-bed process, which proves to be the most effective process at this level.

The invention claimed is:

1. A process for hydroconversion of heavy carbon-containing feedstock comprising (1) hydroconversion of the feedstock in at least one reactor that contains a substrate catalyst in a boiling bed, and then (2) hydroconversion of at least one portion of effluent that is obtained in at least one reactor that contains a slurry catalyst and optionally a solid additive; next subjecting the effluent that is obtained from (2) to one or more separations; in which in the hydroconversion (1), catalyst slurry is prevented from passing into the boiling bed.

2. The process according to claim 1, in which the effluent that is obtained at the end of (1) hydroconversion with a boiling-bed catalyst is subjected to a separation that separates a light fraction that contains at least 90% by volume of compounds that boil at at most 300° C., and the residual effluent is treated in (2) for hydroconversion with a slurry catalyst.

3. The process according to claim 1, in which the effluent that is obtained at the end of (1) hydroconversion with a boiling-bed catalyst is directly treated in (2) hydroconversion with a slurry catalyst.

4. The process according to claim 1, in which the heavy carbon-containing feedstock is a hydrocarbon-containing feedstock that contains at least 50% by weight of product that distills above 350° C. and at least 25% by weight of product that distills above 550° C., and contains at least 50 ppm by weight of metals, at least 0.5% by weight of sulfur, and at least 1% by weight of asphaltenes by deasphalting with heptane.

5. The process according to claim 1, in which the heavy carbon-containing feedstock is a non-petroleum feedstock that contains less than 50% by weight of product that distills above 350° C., less than 10% by weight of asphaltenes by deasphalting with heptane, 0.5 to 50% by weight of oxygen content, 0.2 to 2% by weight of nitrogen content, and 1 to 500 ppm by weight of Na and/or Ca and/or K alkalines.

6. The process according to claim 3, in which the heavy feedstock is petroleum waste, crude oils, topped crude oils, deasphalted oils, deasphalting asphalts, derivatives of processes for conversion of petroleum, bituminous sands or their derivatives, bituminous shale or their derivatives, derivatives of the thermal conversion, with or without catalyst and with or without hydrogen, coal, biomass or industrial waste.

7. The process according to claim 1, in which the slurry catalyst is a sulfur-containing catalyst that contains at least one element that is Mo, Fe, Ni, W, Co, V, or Ru.

8. The process according to claim 1, in which the effluent that is obtained from (2) is sent into a separation section unit separating the gases from a fraction that contains solid particles of catalyst and one or more liquid fractions that are lacking in solids; partly or totally recycling the fraction that contains the solid particles of catalyst that is separated after (2) directly in (2) hydroconversion into slurry.

* * * * *